(12) United States Patent
Byrne

(10) Patent No.: US 6,612,455 B2
(45) Date of Patent: Sep. 2, 2003

(54) CAP LOCK ASSEMBLY AND SYSTEM

(76) Inventor: Joseph M. Byrne, 19632 Crestknoll Dr., Yorba Linda, CA (US) 92886

( * ) Notice: Subject to any disclaimer, the term of this patent is extended or adjusted under 35 U.S.C. 154(b) by 39 days.

(21) Appl. No.: 10/095,770

(22) Filed: Jan. 9, 2002

(65) Prior Publication Data

US 2003/0127457 A1 Jul. 10, 2003

(51) Int. Cl.$^7$ .......................... B65D 51/18; B65D 55/14
(52) U.S. Cl. ................... 220/210; 215/207; 220/259.4; 220/725
(58) Field of Search .................... 215/207, 228, 215/217, 219, 223; 220/210, 725, 726, 727, 255, 256.1, 284, 259.4; 70/158, 179, 346, 347; 49/35

(56) References Cited

U.S. PATENT DOCUMENTS

| | | | | |
|---|---|---|---|---|
| 445,755 A | * | 2/1891 | King ........................... 215/207 |
| 738,917 A | | 9/1903 | Kempien |
| 2,138,871 A | * | 12/1938 | Malluk ......................... 70/165 |
| 2,381,207 A | * | 8/1945 | Coleman ..................... 215/206 |
| 2,772,803 A | * | 12/1956 | Pasquariello ................ 215/219 |
| 3,426,932 A | | 2/1969 | Rouse |
| 3,582,169 A | * | 6/1971 | Koenig ........................... 70/63 |
| 4,014,449 A | * | 3/1977 | Hadley et al. ............... 215/215 |
| 4,690,292 A | * | 9/1987 | Henning ...................... 215/201 |
| 4,796,768 A | * | 1/1989 | Stuckey ....................... 215/207 |
| 4,984,698 A | * | 1/1991 | Stuckey ....................... 215/207 |
| 5,170,900 A | * | 12/1992 | Manera ....................... 215/218 |
| 5,586,670 A | * | 12/1996 | Greenwald .................. 215/207 |
| 5,873,475 A | * | 2/1999 | Volpe .......................... 215/207 |
| 6,032,811 A | | 3/2000 | Marconi |
| 6,082,564 A | * | 7/2000 | Trout .......................... 215/207 |

* cited by examiner

Primary Examiner—Lee Young
Assistant Examiner—Niki M. Eloshway
(74) Attorney, Agent, or Firm—Edgar W. Averill, Jr.

(57) ABSTRACT

A cap lock system for restricting access to a threaded cylindrical end of an access or security device, such as a Schrader valve. An inner lock has a threaded cavity which screws onto an externally-threaded cylindrical end of the Schrader valve. The inner lock itself is received into an open end of an outer cap which captively encloses the inner lock in a manner which allows free rotation between the inner lock and outer cap and prevents the inner lock from being unscrewed. An upper endwall of the outer cap has a keyhole leading into a recessed cavity of the inner lock, with the recessed cavity surrounded by an annular wall. A key is provided for locking and unlocking the inner lock from the Schrader valve. The key has a pivot shaft which is matingly insertable into a section of the keyhole which is configured to support radial loads similar to a journal bearing. A tab connected to a leading end of the pivot shaft is insertable through the keyhole and into the recessed cavity. When the key is turned, the tab is pivotally abutted against the annular flange and the inner lock is wedged against the outer cap. The resulting wedged combination allows torque to be transferred to the inner lock to effect screwing on or off the Schrader valve.

18 Claims, 3 Drawing Sheets

CAP LOCK ASSEMBLY AND SYSTEM

BACKGROUND OF THE INVENTION

The field of the invention generally pertains to locks. The invention relates more particularly to a cap look assembly and system for deterring unauthorized access to a threaded cylindrical end of an access or security device, such as a Schrader valve.

An alarming trend in substance abuse has emerged where children inhale refrigerant gases, commonly sold under the trademark "Freon," taken from air conditioning units. They do so to get a "high," only to become ill and ever die in extreme cases. Tapping into a freon line of an air conditioning unit is made simple and easy for children by the presence of Schrader valves used for servicing freon levels. By simply unscrewing a cap off the valve a child can operate the center pin to release freon gas. Such valve caps serve to cover and protect the center pin from damage, but do not prevent unauthorized access to the valve.

Various protective cap devices have been developed to deter similar unauthorized access by children to containers containing medicine and other potential poisons. Many of these child tamper resistant caps require only that the cap be depressed slightly while rotating the cap. Other similar caps have featured the use of a key to effect release, which in some cases have either complicated the key operation with a multitude of moving parts, or is arguably too simple and easily bypassed by children.

For example, in U.S. Pat. No. 3,426,932, a tamper-proof poison bottle closure is shown having an inner cap 14 capable of threadedly securing to a threaded neck 10 of a bottle and enclosed by an outer cap 32. A torque may be exerted on the inner cap for opening and closing, by using a key 43 to turn a threaded disk-like collar 52 positioned within the outer cap and above the inner cap. Rotation of the collar produces rack-and-pinion actuation of a pair of block-like slides 60 slidably held on vertical tracks 62 along the inner surface of the outer cap. In this manner, and as shown in FIG. 2 of the '932 patent, the block-like slides engage a rib 40 along the top of the inner cap to unscrew the inner cap upon rotation of the outer cap. While this prior art bottle closure serves to restrict access, the many moving components of its rack-and-pinion mechanism may be overly complicated and economically burdensome for mass production.

Additionally, in U.S. Pat. No. 6,032,811, another child-proof cap assembly is shown having an inner cap 11 and enclosed by an outer cap 3. Both the outer cap and inner cap each have respective key slots 6 and 14 which are adapted to receive a key 7. Additionally, the inner cap has an alignment mark 15, and the outer cap has an alignment aperture 16 for assisting a user in aligning the key slots. Upon successful alignment, the key may be inserted through the slots and subsequently rotated to unscrew the inner cap from the container. One of the disadvantages of this prior art cap is that the key itself is attached to and kept together with the cap. Moreover, the slot engagement and operation of the inner cap may be easily manipulated with readily available tools, such as a screwdriver.

And finally, in U.S. Pat. No. 738,917, a bottle stopper is shown having a threaded inner shell for threadedly engaging a neck portion of a bottle, and an outer capsule which encloses the inner shell. The inner shell has a pair of studs 16, 17 extending above a transverse cap portion 4 of the inner shell. A key D have a pair of radial webs 24 is inserted though a key-receiving perforation 11 and engaged with the studs to directly exert a torque on the studs. Arguably, operation of this prior art cap lock is simple, straightforward and intuitive, presenting little difficulty for children having access to the key.

In summary, it would be advantageous to provide a zap lock for deterring children from accessing a restricted space or location and operable by means of a key. Moreover, while the cap lock should be simple in structure, it would be beneficial for the key operation of the cap lock to be sufficiently non-intuitive such that obtaining the key does not guarantee access to the cap lock.

An unrelated problem has arisen from the use of a single size of Schrader valve for feeding different refrigerants, such as those sold under the trademarks "Freon R22," "Freon R410," and "Freon R12." These different refrigerant gases are not compatable. A careless service person could easily feed the wrong refrigerant gas into the Schrader valve, since all systems use the same valve. It would thus, be useful to provide a key which wil only open a lock for one composition of refrigerant gas to help eliminate this potential mistake,

BRIEF SUMMARY OF THE INVENTION

It is thus a general object of the present invention to provide a cap lock assembly and system for restricting access to a threaded cylindrical end of an access or security device, such as a Schrader valve.

It is another object to provide a lock for a Schrader valve a which will open only if the correct key for a specific refrigerant gas is inserted in the lock.

It is a further object of the present invention to provide a cap lock assembly and system having a swivel connection between an inner lock and an outer cap, which prevents release of the inner lock without a key.

It is a still further object of the present invention to provide a cap lock assembly and system which utilizes an abutment tab of a key to pivotally abut the inner lock against the outer cap, to simultaneously (1) produce a transverse wedging force between the inner lock and the outer cap, and (2) transfer a torque on the transversely wedged inner lock.

It is a still further object of the present invention to provide a cap lock assembly and system which provides journal-bearing support to a pivot axis of a key.

It is a still further object of the present invention to provide a cap lock assembly and system whose locking and unlocking mechanism is not readily apparent, even after viewing through a keyhole.

It is a still further object of the present invention to provide a cap lock assembly and system utilizing a key having a faux pivot shaft which is offset from a perceived pivot axis.

It is a still further object of the present invention to provide a simple and cost-effective cap lock assembly and system utilizing a minimum number of parts to effect the foregoing objects, and which is easily machined and manufactured by conventional machining and manufacturing methods.

The present invention is for a cap lock assembly and system for use with a threaded cylindrical end of an access or security device, such as a Schrader valve. In a preferred embodiment, the cap lock system comprises an outer cap having an upper endwall and a cylindrical cap sidewall which extends down from the upper endwall to an open lower end. And the open lower end leads into a cap cavity defined by the outer cap sidewall. The upper endwall has a keyhole extending through the endwall with a journal-bearing section which defines a key pivot axis and supports radial loads.

Additionally, the system comprises an inner lock which is telescopically and captively received within the cap cavity of the outer cap. A radial clearance is provided between the inner lock and the outer cap to enable free rotation about a central axis of rotation and thus prevent the inner lock from being unscrewed. The inner lock has a cylindrical lock sidewall extending between a top end and an open bottom end, with the top end having an annular flange surrounding a recessed cavity which is in communication with the keyhole. The open bottom end leads into an internally-threaded cavity defined by the lock sidewall. The internally-threaded cavity is configured to threadedly receive the threaded cylindrical end of the access or security device when it is rotated about the central axis of rotation.

And finally, the system includes a key used for locking and unlocking the outer cap and inner lock combination. The key has a pivot shaft extending to a leading end, a tab radially connected to the pivot shaft at the leading end, and a key handle for applying a torque on the pivot shaft. The pivot shaft is configured to be matingly inserted into the journal-bearing section of the keyhole and to pivot about the key pivot axis. And the tab is configured to be inserted through the keyhole into the recessed cavity and to pivotally exert a transverse force against the annular flange when a torque is applied on the pivot shaft. When operated in this manner, the inner lock is offset with respect to the outer cap and wedged against the outer cap. The wedging action allows the torque from the key to be transferred to the inner lock so as to effect screwing on or off the threaded cylindrical end.

DESCRIPTION OF THE PREFERRED EMBODIMENTS

Figure 1:
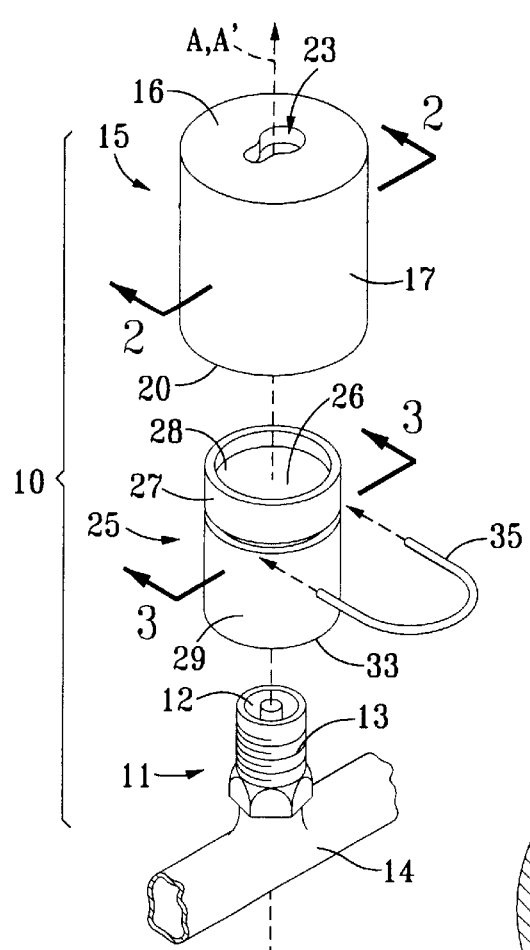
FIG. 1 is an exploded perspective view of a preferred embodiment of the cap lock assembly, and illustrating a preferred application with a Schrader valves

Referring now to the drawings, FIG. 1 shows a preferred embodiment of a cap lock assembly (hereinafter "assembly"), generally indicated at reference character 10, for use with a threaded cylindrical end of an access or security device, such as a Schrader valve 11. As shown, the assembly 10 generally comprises two main components: an outer cap 15, and an inner lock 25 which is telescopically positioned within the outer cap 15. It is notable, however, that the assembly 10 is part of a greater cap lock system (hereinafter "system") additionally including a key 37 shown in FIG. 5. Within the larger system, the assembly 10 is the main structure capable of releasably securing to the threaded cylindrical end of the access or security device, and the key 37 operates to secure or release the assembly 10 therefrom. It is also initially notable that both the outer cap 15 and the inner lock 25 preferably have a metallic construction machined using manufacturing and machining techniques known in the relevant art. It is known to the applicant that a brass construction for the inner lock 25 and an aluminum construction for the outer cap 15 provide satisfactory characteristics in combination for effective operation of the present invention.

A preferred application of the cap lock assembly 10 and system is in locking and restricting access to a common Schrader valve 11. As can be seen in FIG. 1, the Schrader valve 11 has a generally cylindrical end configuration connecting to a fluid supply, such as a refrigerant gas line 14. A valve opening 12 and a center pin 12' are located at an upper end of the cylindrical configuration. When the center pin 12' is depressed fluid is permitted to flow through the valve opening 12. External threads 13 encircle the neck of the Schrader valve 11 below the valve opening 12. Thus it can be appreciated that threaded engagement of a cap-like structure to the threads 13 will operate to cover and protect the center pin 12' and valve opening 12 at the upper end.

Figure 3:
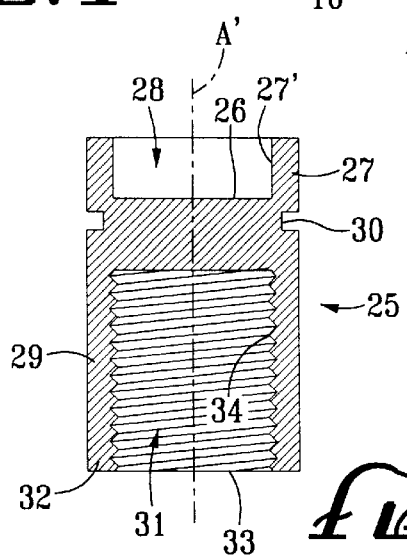
FIG. 3 is a cross-sectional view of a preferred embodiment of the inner lock of the cap lock assembly taken along the line 3—3 of FIG. 1.

The inner lock 25 operates to enclose the Schrader valve 11 by threaded engagement. In a preferred embodiment, shown in FIGS. 1, 3 and 5, the inner lock 25 has a cylindrical configuration with a transverse upper deck 26 at a top end, and a cylindrical sidewall 29 extending from the upper deck 26 down to an annular rim 32 of an open bottom end 33. The cylindrical sidewall 29 surrounds a lock cavity 31 with the open lower end 33 leading therein. And the lock cavity 31 has an internally threaded cavity surface 34 for attaching the inner lock 25 to the Schrader valve 11 by threadedly engaging the threads 13 of the Schrader valve 11 shown in FIG. 1. Additionally, the top end of the inner lock 25 has a recessed cavity 28 which is surrounded by an annular flange 27. The annular flange 27 has an abutment surface 27' for receiving a transverse force exerted from within the recessed cavity 28, as will be discussed in detail below.

Figure 2:
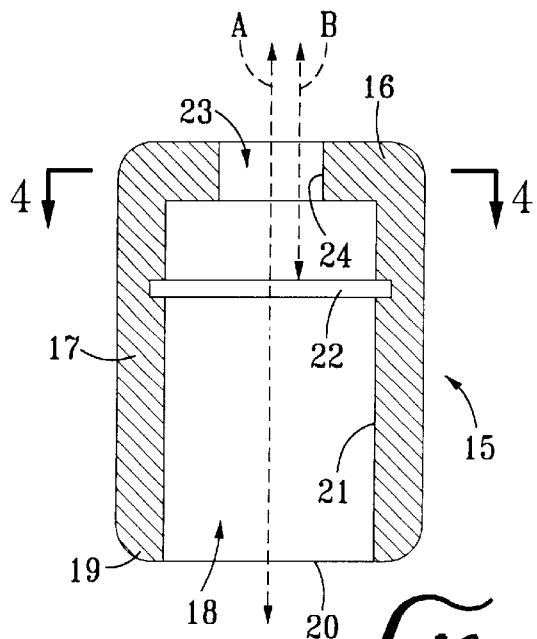
FIG. 2 is a cross-sectional view of a first preferred embodiment of the outer cap of the cap lock assembly taken along the line 2—2 of FIG. 1.
Figure 4:
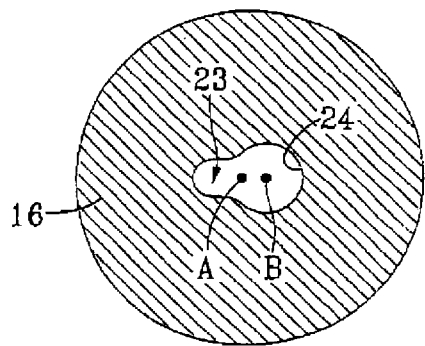
FIG. 4 is a top view of the outer cap member taken along the line 4—4 of FIG. 2 and illustrating a preferred embodiment of a keyhole formed thereon.
Figure 5:
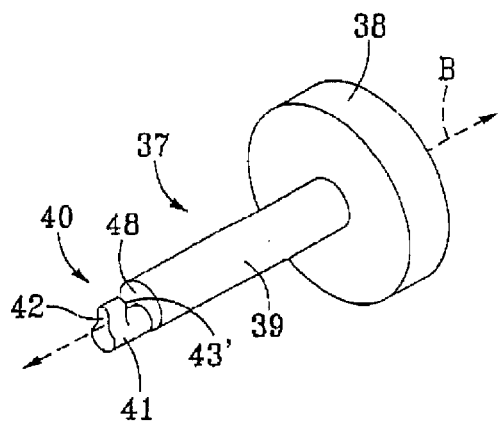
FIG. 5 is a perspective view of a preferred embodiment of a key used in the cap lock system.

Captively enclosing the inner lock 25 is an outer cap 15 shown in FIGS. 1, 2 and 4. Generally, the outer cap 16 has a cylindrical configuration with a central axis of rotation A, an upper endwall 16 transverse to the central axis of rotation A, and a cylindrical cap sidewall 17 connected to and extending below the upper endwall 16 to a lower annular rim 19. The cap sidewall 17 surrounds a cylindrical cap cavity 18, and the lower annular rim 19 defines an open end 20 leading into the cap cavity 18. As shown in FIGS. 1 and 5, the inner lock 25 is telescopically received into the cap cavity 18 along the central axis of rotation A with a sufficient radial clearance 36 between the inner lock 25 and the outer cap 15. The radial clearance 36 produces a swivel connection and relationship between the inner lock 25 and the outer cap 15 which allows free rotation relative to each other generally about the central axis of rotation A. It is notable that the radial clearance 36 is sufficiently marginal such that the central axis of rotation A is common to both the outer cap 15 and the inner lock 25, except as noted in FIGS. 8 and 9 discussed below. It is further notable that the inner lock 25 is captively held within the outer cap 15 and prevented from exiting the cap cavity 18. This is preferably accomplished using a resilient-biasing snap clip 33 shown in FIGS. 1 and 5, which when properly aligned, snaps into engagement with opposite grooves 22 and 30 formed on the cap sidewall 17 and the lock sidewall 29, respectively. Alternatively, the annular rim 19 of the outer cap 15 may be crimped subsequent to receiving the inner lock 25 therein.

Furthermore, the upper endwall 16 of the outer cap 15 has a keyhole 23 communicating through the upper endwall 16, for insertably receiving a key (37 in. FIG. 5, see discussion below). As can be seen in FIG. 4, the keyhole 23 preferably has an eccentric curvilinear configuration with a journal-bearing section 24. The journal-bearing section 24 has a substantially cylindrical configuration which defines a key pivot axis B and provides journal support to a rotating shaft (i.e. a pivot shaft 41 of the key 37). Thus the journal-bearing section 24 is configured to support radial loads exerted thereon In the preferred embodiment shown in the figures, the keyhole 23 and the key pivot axis B are offset from the central axis of rotation A with the axes A and B generally parallel to each other. Additionally, various sizes and configurations of keyholes may be employed for different applications, with each size/configuration indicating a property or application to be differentiated from another property or application. For air conditioning systems which utilize Schrader valves to access freon, various sizes/configurations of the keyhole 23 may be employed to indicate which one of the common R-12, R-22, and R-410 types of Freon brand of refrigerant is used in a particular unit (see further discussion below).

FIG. 5 shows a key 37 which is used for rotatably operating the assembly 10 to screw the assembly 10 on or off the Schrader valve 11. As can be seen, the key 37 has an insertion end 40 for inserting into the keyhole 23. The insertion end 40 comprises a pivot shaft 41 extending to a leading end, and a tab 42 radially connected to the leading end. And the pivot shaft 41 and the tab 42 are sized and configured to be inserted into the keyhole 23, with the tab 42 and the leading end of the pivot shaft 41 insertable past the upper endwall 16 and into the tab-receiving recessed cavity 26. Preferably, the tab 42 and the leading end of the pivot shaft 41 are matingly insertable into the keyhole 23, with the tab 42 and leading end of the pivot shaft 41 preferably having an eccentric curvilinear cross-section similar to the keyhole 23 shown in FIG. 4.

The pivot shaft 41 in particular has a circular cross-section which mates with the journal-bearing section 24 of the keyhole 23 for journaling therein during key operation. In this respect, the key pivot axis B is common to both the journal-bearing section 24 and the pivot shaft 41. Additionally, the pivot shaft 41 connects in an offset manner to a shank end 43 of an elongated shank 39, such that the key pivot axis B of the pivot axis 41 is parallel to a longitudinal center axis (not shown) of the elongated shank 39. The elongated shank 39 is shown in FIG. 5 centrally connected to a key handle 38 having a cylindrical knob configuration. It is believed that this offset arrangement between the pivot shaft 41 and the elongated shank 39 creates an illusion that the elongated shank 39 pivots about its longitudinal center axis. Once the insertion end 40 is insertably positioned in the keyhole 23, a user sees only the elongated shank 39 extending out from the upper endwall 16. Thus, the use of the elongated shank 39 as a "faux" pivoting shaft is believed to induce some confusion and increased difficulty of operation for users not familiar with the assembly 10 and system.

Figure 6:
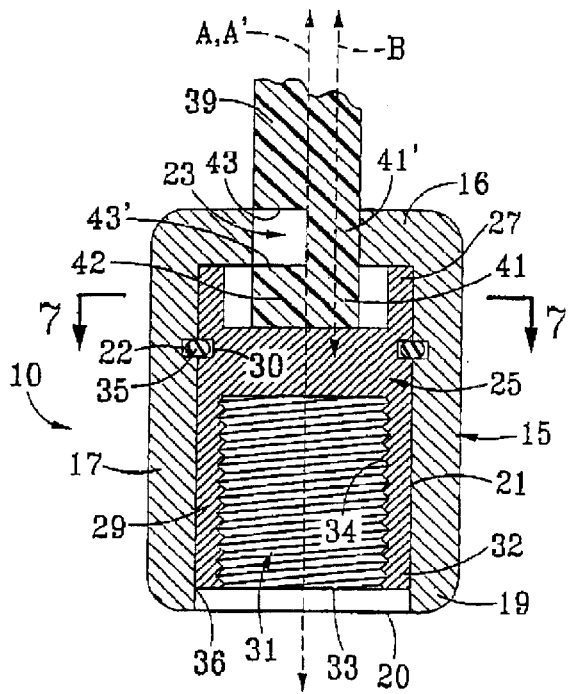
FIG. 6 is a combined cross-sectional view of the cap lock system, similar to that of FIGS. 2 and 3.
Figure 7:
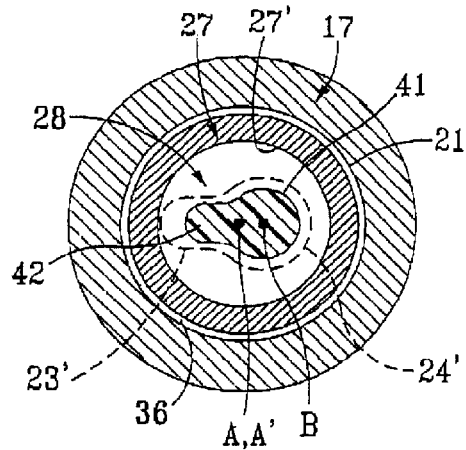
FIG. 7 is a cross-sectional view of the cap lock system taken along line 7—7 of FIG. 6, and showing the key in a first inserted position prior to rotation.

Details of a key operated locking and unlocking mechanism associated with the present invention are shown in FIGS. 6-9. Initially, as shown in FIGS. 6 and 7, the insertion end 40 of the key 37 is inserted into the keyhole 23, with leading end of the pivot shaft 41 and the tab 42 received into the recess cavity 28. For purposes of illustration, the inner Lock 25 and outer cap 15 are shown to align concentrically along the central axis of rotation A so as to have equal radial clearance 36 all around. It is notable here that the shank end is a transverse surface 43 which contacts an outer surface Of he upper endwall 16. Furthermore, as can be best seen in FIG. 5, the transverse surface 43 is substantially aligned with the tab 42 so as to form a gap therebetween having a width marginally greater than the thickness of the upper endwall 16. It is believed that this contacting support arrangement and alignment of the transverse surface 43 operates to provide improved axial stability to the key 37 when pivoting about the key pivot axis B, as will be discussed next.

Upon exerting a torque at the key handle 38 by a user, the pivot shaft 41 and the tab 42 are caused to rotate about the key pivot axis B. FIG. 7 illustrates a locking action of the assembly 10 when the tab 42 is pivoted in the direction of arrow C in FIG. 8. And FIG. 9 illustrates an unlocking action of the assembly 10 when the tab 42 is pivoted in the direction of arrow D. In either case, the tab 42 is abutted against the annular flange 27 to exert a transverse force thereagainst at contact points 44 in FIG. 8 and 45 in FIG. 9. As shown, the transverse force is directed along the radial line E in FIG. 8 and radial line F in FIG. 9. It is appreciated, however, that the direction of the transverse force is a function of the contact angle of the abutment surface 27' of a general abutment portion, (e.g. the annular flange 27) of the inner lock 25.

Figure 8:
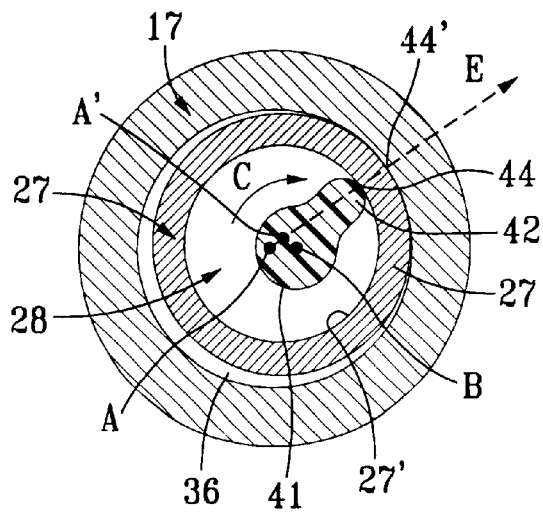
FIG. 8 is a cross-sectional view of the cap lock system similar to and following FIG. 7, and illustrating the relative offset and wedging action which occurs between the inner lock and the outer cap when the cap lock assembly is screwed onto a threaded cylindrical end.
Figure 9:
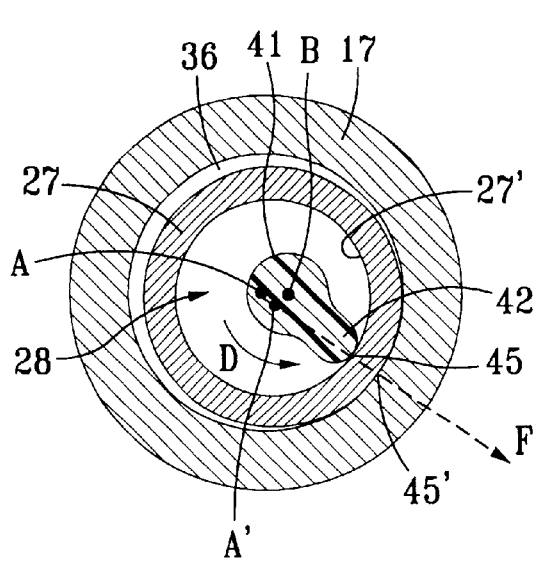
FIG. 9 is a cross-sectional view of the cap lock system similar to and following FIG. 7, and illustrating the relative offset and wedging action which occurs between the inner lock and the outer cap when the cap lock assembly is unscrewed from a threaded cylindrical end.

Furthermore, the abutment of the tab 42 against the annular flange 27 causes the inner lock 25 to be offset and radially displaced relative to the outer cap 15, such that its displaced axis of rotation is designated at reference character A in FIGS. 8 and 9. In this respect, the tab 42 operates as a cam arm to translate rotational motion into linear motion. The offset causes the inner lock 25 to abut against the inner cavity surface (21 in FIG. 2) of the cap sidewall 17 at point 44' in FIG. 8 and point 45' in FIG. 9, and consequently wedge or clamp the inner lock 25 against the outer tab 15. It is appreciated that the transverse force and wedging action of the key operation is made possible by the journal relationship between a neck portion 41' of the pivot shaft 41 and the journal-bearing section 24 of the outer cap 15. In particular, the journal-bearing section 24 supports the equal and opposite radial load produced by the transverse force.

It is notable here that the annular flange 27 which effects the wedge-locking and wedge-unlocking of the assembly 10 is preferably positioned remotely peripheral to the keyhole 23 within the outer cap 15. This arrangement is believed to provide a deterrence in itself in that a user peering into the keyhole 23 of a deployed assembly 10 is not provided any readily apparent hint or indication as to the nature of the unlocking mechanism. Even in the case where the key 37 for a particular assembly 10 is somehow obtained, unfamiliarity with the wedging principle, which is the basis of the present invention, may prove a sufficient barrier to access.

It is additionally notable that the unique locking/unlocking operation of the assembly 10 and system may be particularly useful in the air conditioning industry by assisting in the identification of the type of refrigerant used in any particular air conditioning unit. Due to the incompatibility of various types of refrigerants, such as the common R-12, R-22, and R-410, brands of refrigerants sold under the trademark "Freon" discussed previously, it is important to determine the type of refrigerant which is present in an air conditioning unit. To this end, a set of cap lock systems may be utilized in a preferred method of identifying the refrigerant contained in an air conditioning unit.

In the preferred method of refrigerant identification, a standard is established with each cap lock system (i.e. assembly and key) in the set exclusively associated with one of the available refrigerant types, and each key identified with a correspondingly associated refrigerant. Furthermore, the keyhole and corresponding key of each system in the set is configured to exclusively cooperate with each other to abut the tab against the abutment portion, e.g. annular flange, of the inner lock. In other words, each keyhole and key pair is configured such that substituting either one would either (1) not permit entry of the key into the keyhole, or (2) not produce an abutment of the tab against the abutment portion to effect the locking/unlocking.

Figure 2A:
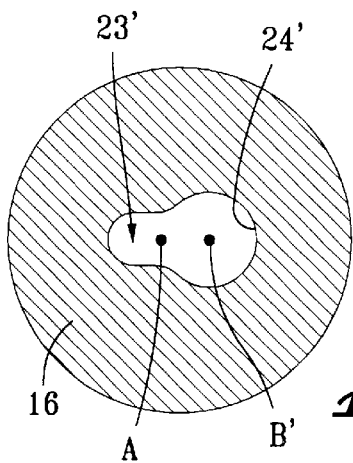
FIG. 2A is a cross-sectional view of a second preferred embodiment of the outer cap of the cap lock assembly similar to FIG. 2, and having a larger keyhole than the keyhole of the first preferred embodiment.
Figure 10:
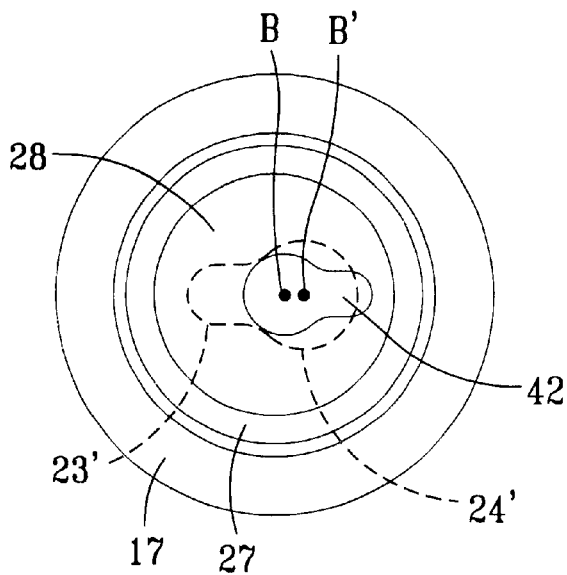
FIG. 10 is a cross-sectional view of a second preferred embodiment of the cap lock assembly having the larger keyhole of FIG. 2A, and shown with the tab of the smaller first preferred embodiment of FIGS. 6–9.

FIGS. 2A and 10 illustrate this premise of the preferred method. As can be seen in FIG. 2A, a second preferred embodiment of the keyhole is designated at reference character 23' with a journal-support section 24'. Compared to the keyhole 23 of the first preferred embodiment, the journal-support section 24' of the keyhole 23' has a greater diameter for matingly receiving a corresponding tab and leading end (not shown). And as can be seen in FIG. 10, when a smaller key (which is configured to mate with the keyhole 23 of the first preferred embodiment) is inserted into the larger keyhole 23', the pivot axis B of the smaller key is no longer the same as the pivot axis B defined by the keyhole 23'. This is due to the fact that the pivot shaft of the key must abut against a side of the journal-support section 24' which is opposite the contact point between the tab 42 and the abutment portion, i.e. annular flange 27, in order to support the radial load produced thereby. Thus it can be seen that the tab 42 of the smaller incorrect key will not abut against the annular flange 27 in a manner to wedge the inner lock against the outer cap and transfer a torque to the inner lock. It is appreciated that key sizes which are greater than the keyhole 23' would not be insertable therethrough, and would therefore obviate a mismatch.

With this arrangement, a cap lock assembly which was previously installed on a Schrader valve in accordance with the associated refrigerant contained in the air conditioning unit, can be used by a later service person to identify the type of refrigerant contained in the unit. First, the tab of a selected key from the set of cap lock systems is inserted through the keyhole and into the tab-receiving cavity. Then, by pivoting the key, a user may determine whether the tab was abutted against the annular flange 27 or other abutment portion in a manner which wedges the inner lock against the outer cap and transfers a torque from the key to the inner lock. If a particular key is discovered to produce such an effect, the refrigerant contained in the air conditioning unit can be identified as the type identified by the successful key.

While the foregoing discussion specifically involves application of the assembly 10 and system to Schrader valves, they are not limited only to such. The assembly 10 and system may be utilized with other applications, such as access and security applications, which involve a basic threaded cylindrical end configuration. For example, the assembly 10 and system may be used for securing BNC (bayonet nut connector) type coaxial cable connectors, so as to restrict access to cable TV connections and local area computer networks. Furthermore, it is notable that the threaded cylindrical end configuration of the access or security device is not necessarily limited to externally threaded cylindrical end configurations typified by Schrader valves. Alternatively, it is appreciated that a cylindrical end configuration having an internally threaded cavity may be employed with the access or security device or implement. In such a case, a second embodiment of the inner lock (not shown) may be utilized having an externally threaded plug end.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

I claim:

1. A cap lock system for use with a threaded cylindrical end of an access or security device, said cap lock system comprising:

an outer cap having an upper endwall with a keyhole therethrough, said keyhole having a journal-bearing section defining a key pivot axis, and a cylindrical cap sidewall extending down from the upper endwall to an open lower end, said open lower end leading into a cap cavity defined by the outer cap sidewall;

an inner lock telescopically and captively received within the cap cavity of the outer cap with a radial clearance therebetween to enable free rotation about a central axis of rotation, said inner lock having a cylindrical lock sidewall extending between a top end and an open bottom end, said top end having an annular flange surrounding a recessed cavity which is in communication with the keyhole, and said open bottom end leading into an internally-threaded cavity defined by the lock sidewall for threadedly receiving the threaded cylindrical end of the access or security device when rotated about the central axis of rotation; and a key having a pivot shaft extending to a leading end, a tab radially connected to the pivot shaft at the leading end, and a key handle for applying a torque on the pivot shaft, said pivot shaft for matingly inserting into the journal-bearing section of the keyhole to pivot about the key pivot axis, and said tab for inserting through the keyhole into the recessed cavity and for pivotally exerting a transverse force against the annular flange when a torque is applied on the pivot shaft, whereby the inner lock is offset with respect to the outer cap and wedged against the outer cap so as to transfer the applied torque to the inner lock.

2. The cap lock system as in claim 1, wherein the journal-bearing section of the keyhole and the corresponding key pivot axis are offset from the central axis of rotation.

3. The cap lock system as in claim 1,
wherein the tab has an eccentrically curvilinear cross section.

4. The cap lock system as in claim 1,
wherein the tab has an abutment end with a curvilinear surface for contacting the annular flange.

5. The cap lock system as in claim 1,
wherein the key has a transverse support surface for contacting an outer surface of the upper endwall to provide axial stability to the pivot shaft when pivoted about the key pivot axis.

6. The cap lock system as in claim 5,
wherein the transverse support surface forms a lower terminus of an elongated shank of the key, said elongated shank having a longitudinal center axis parallel to the key pivot axis, with the key handle centered with respect to the longitudinal axis.

7. A cap lock system for use with a threaded cylindrical end of an access or security implement, said cap lock system comprising:
an outer cap having an upper endwall with a keyhole therethrough, said keyhole having a journal-bearing section defining a key pivot axis, and a cylindrical cap sidewall extending down from the upper endwall to an open lower end, said open lower end leading into a cup cavity defined by the outer cap sidewall;
an inner lock telescopically and captively received within the cap cavity of the outer cap with a radial clearance therebetween to enable free rotation about a central axis of rotation, said inner lock having means for threadedly engaging the threaded cylindrical end when rotated about the central axis of rotation, and an abutment portion adjacent the upper endwall and peripheral to a tab-receiving cavity which is in communication with the keyhole, said abutment portion for supporting a transverse force exerted thereon in a transverse direction to the central axis of rotation;
a key having a pivot shaft extending to a leading and, a tab radially connected to the pivot shaft at the leading end, and a key handle for applying a torque on the pivot shaft, said pivot shaft for matingly inserting into the journal-bearing section of the keyhole to pivot about the key pivot axis, and said tab for inserting through the keyhole into the tab-receiving cavity and for pivotally exerting a transverse force against the abutment portion when a torque is applied or the pivot shaft, whereby the inner lock is offset with respect to the outer cap and wedged against the outer cap so as to transfer the applied torque to the inner lock.

8. The cap lock system as in claim 7,
wherein the means for threadedly engaging the threaded cylindrical end of the access or security implement is an internally-threaded cavity formed by a cylindrical lock sidewall of the inner lock.

9. The cap lock system as in claim 7,
wherein the journal-bearing section of the keyhole and the corresponding key pivot axis are offset from the central axis of rotation.

10. The cap lock system as in claim 7,
wherein the abutment portion is an annular flange surrounding the tab-receiving cavity.

11. The cap lock system as in claim 7,
wherein the tab has an eccentrically curvilinear cross section.

12. The cap lock system as in claim 7,
wherein the tab has an abutment end with a curvilinear surface for contacting the abutment portion.

13. The cap lock system as in claim 7,
wherein at least one of an abutment end of the tab and the abutment portion of the inner lock has a curvilinear contact surface.

14. The cap lock system as in claim 7,
wherein the key has a transverse support surface for contacting an outer surface of the upper endwall to provide axial stability to the pivot shaft when pivoted about the key pivot axis.

15. The cap lock system as in claim 14,
wherein the transverse support surface forms a lower terminus of an elongated shank of the key, said elongated shank having a longitudinal center axis parallel to the key pivot axis, with the key handle centered with respect to the longitudinal axis.

16. A cap lock assembly for use with a threaded cylindrical end of an access or security device said cap lock assembly operable in conjunction with a key of a type having a pivot shaft extending to a leading end, a tab radially connected to the pivot shaft at the leading end, and a key handle for rotating the pivot shaft, said cap lock assembly comprising:
an outer cap having an upper endwall with a keyhole therethrough for receiving the leading end of the pivot shaft and the tab, said keyhole having a journal-bearing section for matingly receiving the pivot shaft such that the pivot shaft may pivot about a key pivot axis defined by the journal-bearing section, and a cylindrical cap sidewall extending down from the upper endwall to an open lower end, said open lower end leading into a cap cavity defined by the outer cap sidewall; and
an inner lock telescopically and captively received within the cap cavity of the outer cap with a radial clearance therebetween to enable free rotation about a central axis of rotation, said inner lock having a cylindrical lock sidewall extending between a top end and an open bottom end, said top end having an annular flange surrounding a recessed cavity which is in communication with the keyhole, and said open bottom end leading into an internally-threaded cavity defined by the lock sidewall for threadedly receiving the threaded cylindrical end of the access or security device when rotated about he central axis of rotation,
whereby, upon inserting the tab and the leading end of the pivot shaft through the keyhole and into the recessed cavity and applying a torque on the pivot shaft, the tab pivotally exerts a transverse force on the annular flange to offset the inner lock with respect to the outer cap and wedge the inner lock against the outer cap so as to transfer the applied torque to the inner lock.

17. The cap lock system as in claim 16,
wherein the journal-bearing section of the keyhole and the corresponding key pivot axis are offset from the central axis of rotation.

18. A method of identifying a refrigerant used in an air conditioning unit from among a set of available refrigerants, the air conditioning unit having a Schrader valve which provides access to the refrigerant, said method comprising the steps of:
providing a cap lock assembly which is threadedly secured to the Schrader valve for restricting access thereto, said cap lock assembly associated with the refrigerant used in the air conditioning unit and selected from a set of cap lock assemblies each associated with one of the set of available refrigerants, each of the set of cap lock assemblies including an inner lock which is threadedly securable to the Schrader valve, and an outer cap which captively encloses the inner lock to form a tab-receiving cavity therebetween and which is swivel connected to the inner lock to enable free rotation relative to each other, the inner lock having an abutment portion adjacent the tab-receiving cavity, and the outer cap having a keyhole communicating through to the tab-receiving cavity;

providing a set of keys each identified with one of the set of refrigerants for locking and unlocking a corresponding one of the set of cap lock assemblies from a Schrader valve, each key having a tab at an insertion end thereof and adapted to exclusively cooperate with the keyhole of a corresponding cap lock assembly to pivotally abut the tab against the inner lock so as to wedge the inner lock against the outer cap;

inserting the tab of a key selected from the set of keys through the keyhole of the threadedly secured cap lock assembly and into the tab-receiving cavity thereof;

pivoting the tab of the selected key within tab-receiving cavity;

determining if the tab of the selected key pivotally abuts against the abutment portion of the inner lock to wedge the inner lock against the outer cap and transfer a torque to the inner lock; and identifying the refrigerant in the air conditioning unit as a type identified with the selected key upon a determination that the tab pivotally abutted against the abutment portion to wedge the inner lock against the outer cap and transfer a torque to the inner lock.

* * * * *